United States Patent
Tachihara et al.

(10) Patent No.: US 6,905,327 B2
(45) Date of Patent: Jun. 14, 2005

(54) METHOD OF WARMING UP A FUEL EVAPORATOR

(75) Inventors: Takahiro Tachihara, Saitama (JP); Kiyoshi Kasahara, Saitama (JP); Satoshi Hanai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 671 days.

(21) Appl. No.: 09/900,793

(22) Filed: Jul. 6, 2001

(65) Prior Publication Data

US 2002/0056316 A1 May 16, 2002

(30) Foreign Application Priority Data

Jul. 6, 2000 (JP) ........................... 2000-205746

(51) Int. Cl.$^7$ ................................. F23D 14/00
(52) U.S. Cl. ................................. 431/5; 431/7
(58) Field of Search .................... 431/5, 7, 170, 431/202; 422/183

(56) References Cited

U.S. PATENT DOCUMENTS

| | | | |
|---|---|---|---|
| 6,176,078 B1 * | 1/2001 | Balko et al. | 60/274 |
| 6,363,716 B1 * | 4/2002 | Balko et al. | 60/286 |
| 6,413,484 B1 * | 7/2002 | Koch | 423/245.3 |
| 6,520,769 B2 * | 2/2003 | Tachihara et al. | 431/170 |

FOREIGN PATENT DOCUMENTS

JP 11-086893 3/1999

* cited by examiner

Primary Examiner—Alfred Basichas
(74) Attorney, Agent, or Firm—Lahive & Cockfield, LLP; Anthony A. Laurentano, Esq.

(57) ABSTRACT

A method of warming up a fuel evaporator is disclosed. The fuel evaporator 2 comprises: an evaporation chamber 2b equipped with a first injection device 2a for injecting raw fuel liquid onto a heat source 2p, and vaporizing the raw fuel liquid on the heat source; a catalyst combustor 20 having a combustion catalyst 22a, and introducing catalytically burned combustion gas into the heat source; a second injection device 30 for supplying fuel to the catalyst combustor; a combustion gas transferring device 10 equipped with a fuel injection portion 10a and a combustion catalyst 10c, and the fuel injection portion injecting fuel onto the combustion catalyst to generate a catalytically burned gas; a first temperature measurement device T1 for the catalyst combustor; and a second temperature measurement device T2 for the evaporation chamber. The warm-up method comprises the steps of: transferring the combustion gas with the combustion gas transferring device; stopping the combustion gas transferring device in accordance with a temperature of the catalyst combustor, and transferring fuel to the catalyst combustor with the second injection device; and injecting the raw fuel liquid from the first injection device in accordance with a temperature of the evaporation chamber so as to vaporize the raw fuel liquid within the evaporation chamber.

15 Claims, 6 Drawing Sheets

METHOD OF WARMING UP A FUEL EVAPORATOR

FIELD OF THE INVENTION

The present invention relates to a method of warming up a fuel evaporator. The fuel evaporator (also referred to as a fuel vaporizer) vaporizes raw fuel liquid, such as a mixture of methanol and water, and supplies raw fuel gas to a subsequent apparatus.

BACKGROUND OF THE INVENTION

Figure 6A:
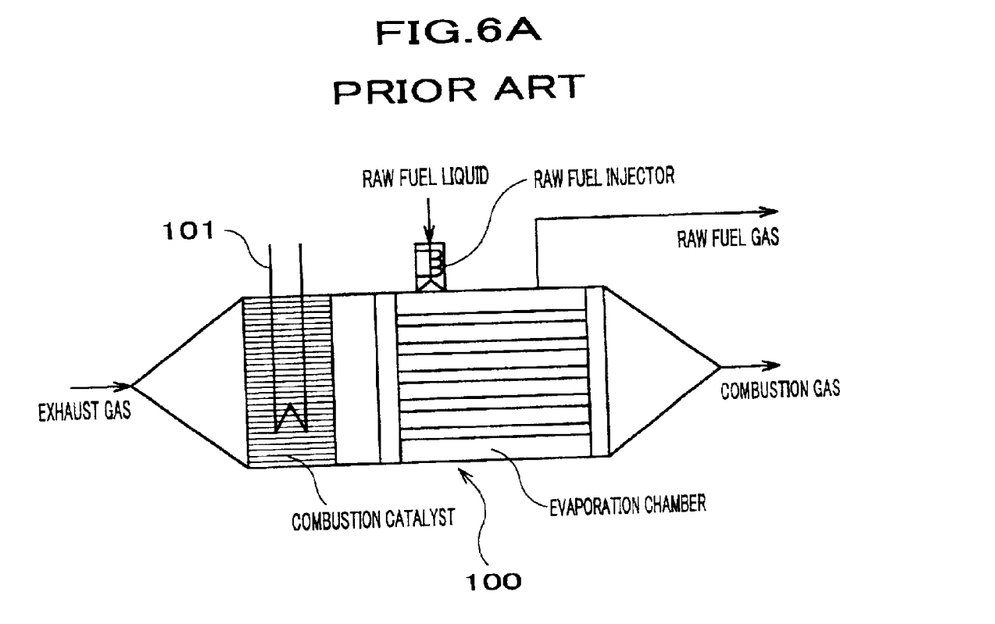
FIG. 6A shows a warm-up method with the use of an electric heater.
Figure 6B:
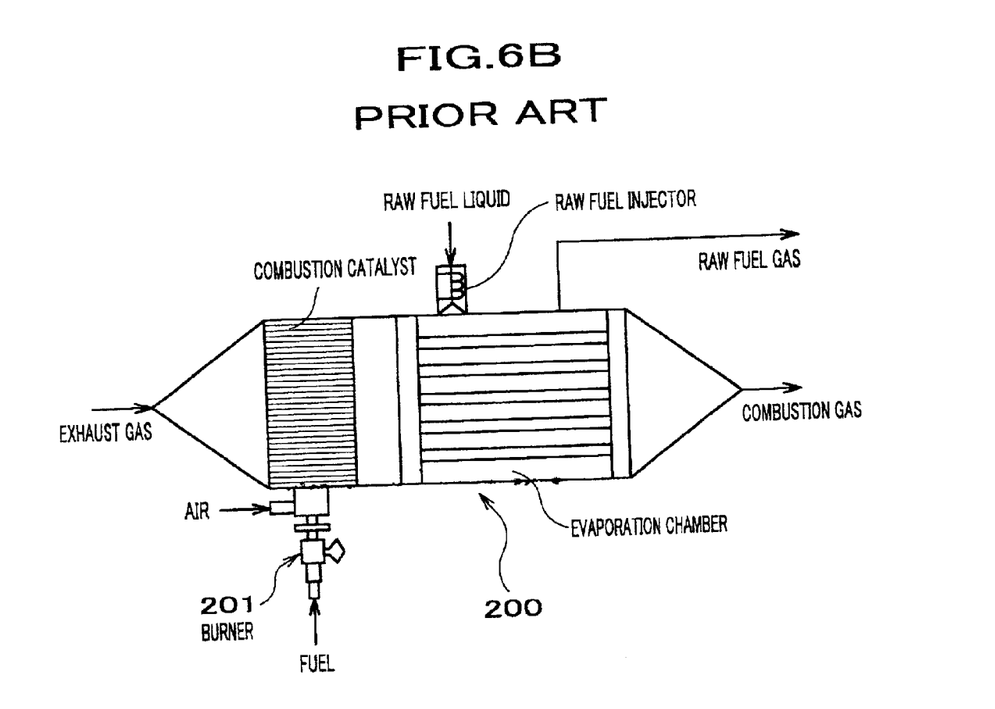
FIG. 6B shows a warm-up method with the use of a combustion burner.

As a heat source for warming up a conventional fuel evaporator 100 or 200, an electric heater 101 shown in FIG. 6A and a combustion burner 201 shown in FIG. 6B are known. A warm-up method with the electric heater 101 or the combustion burner 201 is carried out either by directly or indirectly heating the fuel evaporator. In the indirect heating, gas or liquid is heated by a heat source, such as the electric heater 101, and the heated gas or liquid is used as a heat transfer medium.

For example, Japanese Laid-open Patent Publication No. Hei 11-86893 discloses a warming up method, in which fuel is burned with a combustion burner to generate heat, and a heat exchanger utilizes the resulting heat for raising the temperature of a raw material.

Further, the applicant discloses a warm-up apparatus in Japanese Patent Application No. Hei 11-315996 (unpublished). The warm-up apparatus is equipped with a catalyst combustor for generating a gas for raising the temperature of the raw material. The electric heater 101 shown in FIG. 6A and the combustion burner 201 shown in FIG. 6B are used for raising the temperature of the catalyst combustor.

However, when the flow rate of the exhaust gas (also referred to as an "off gas") flowing in the piping becomes greater, electric power consumption becomes greater in the case of heating with the electric heater 101. Meanwhile, in the case of heating with the combustion burner 201, there are problems, such as increasing amount of the exhaust gas of the combustion burner 201 and increasing size of the burner itself.

However, because both of the above warm-up methods are poor in heating efficiency, it takes time for completing the warming-up of the fuel evaporator 100 or 200 after actuating or starting the warm-up apparatus.

In order to eliminate the foregoing drawbacks of the prior art, the present invention seeks to provide a method of warming up a fuel evaporator, which ensures a quick and reliable warm-up operation from the start of the warm-up apparatus to the end of the operation.

SUMMARY OF THE INVENTION

According to one aspect of the present invention, there is provided a method of warming up a fuel evaporator, the fuel evaporator comprising:
  an evaporation chamber equipped with a first injection device for injecting raw fuel liquid onto a heat source, and vaporizing the raw fuel liquid on the heat source;
  a catalyst combustor having a combustion catalyst, and introducing catalytically burned combustion gas into the heat source of the evaporation chamber;
  a second injection device for supplying fuel to the catalyst combustor;
  a combustion gas transferring device equipped with a fuel injection portion and a combustion catalyst, and the fuel injection portion injecting fuel onto the combustion catalyst to generate a catalytically burned gas, which is then transferred to the catalyst combustor;
  a first temperature measurement device for measuring a temperature of the catalyst combustor; and
  a second temperature measurement device for measuring a temperature of the evaporation chamber,
wherein the method comprising the steps of:
  transferring the combustion gas with the combustion gas transferring device;
  stopping the combustion gas transferring device in accordance with a temperature of the catalyst combustor measured by the first temperature measurement device, and transferring fuel to the catalyst combustor with the second injection device; and
  injecting the raw fuel liquid from the first injection device in accordance with a temperature of the evaporation chamber measured by the second temperature measurement device so as to vaporize the raw fuel liquid within the evaporation chamber.

With such a method, it is possible to finish warming up the catalyst combustor at an optimum timing and to generate combustion gas used as an evaporation heat source. Further, it is possible to ensure a smooth operation from the star to the end of the warm-up of the fuel evaporator, because the raw fuel liquid to be vaporized is injected at an optimum timing. Therefore, a smooth and effective warm-up operation can be carried out.

According to another aspect of the present invention, there is provided a method of warming up a fuel evaporator, the fuel evaporator comprising:
  an evaporation chamber equipped with a first injection device for injecting raw fuel liquid onto a heat source, and vaporizing the raw fuel liquid on the heat source;
  a catalyst combustor having a combustion catalyst, and introducing catalytically burned combustion gas into the heat source of the evaporation chamber;
  a second injection device for supplying fuel to the catalyst combustor;
  a combustion gas transferring device equipped with a fuel injection portion and a combustion catalyst, and the fuel injection portion injecting fuel onto the combustion catalyst to generate a catalytically burned gas, which is then transferred to the catalyst combustor;
  a first temperature measurement device for measuring a temperature of the catalyst combustor; and
  a second temperature measurement device for measuring a temperature of the evaporation chamber,
wherein the method comprising the steps of:
  transferring the combustion gas with the combustion gas transferring device;
  transferring fuel to the catalyst combustor with the second injection device, while transferring the combustion gas with the combustion gas transferring device in accordance with a temperature of the catalyst combustor measured by the first temperature measurement device, and
  injecting the raw fuel liquid from the first injection device in accordance with a temperature of the evaporation chamber measured by the second temperature measurement device so as to vaporize the raw fuel liquid within the evaporation chamber.

With such a method, even after completing the warm-up operation of the catalyst combustor, it is possible to supply heat to the catalyst combustor. Therefore, in addition to the merits of the aforementioned warm-up method, it is possible to prevent liquid pool, because vaporization of fuel which generates combustion gas is promoted. As a result, a warm-up operation can be carried out effectively.

BRIEF DESCRIPTION OF THE DRAWINGS

Preferred embodiments of the present invention will be described below, by way of example only, with reference to the accompanying drawings, in which:

FIGS. 6A and 6B show an explanatory view for a conventional warm-up method of a fuel evaporator, respectively, in which

DESCRIPTION OF THE PREFERRED EMBODIMENT

Figure 1:
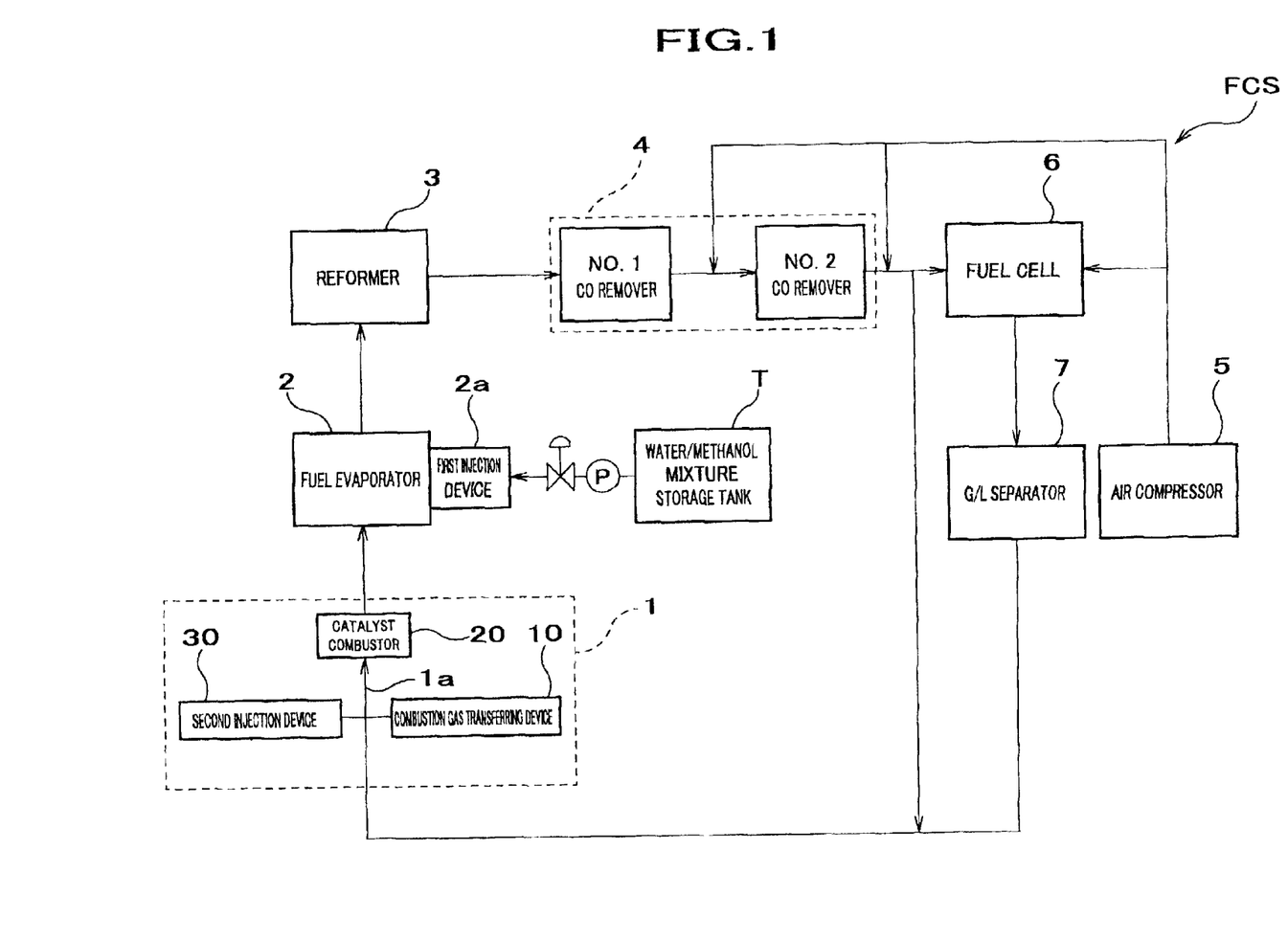
FIG. 1 is a block diagram illustrating the overall structure of a fuel cell system, to which is adapted a warm-up method of a fuel evaporator according to the present invention.

Firstly, with reference to FIGS. 1 and 2, the overall arrangement of a fuel cell system FCS, to which is adapted a warm-up method of a fuel evaporator according to the present invention, will be described.

The fuel cell system FCS mounted on a vehicle comprises:

a warm-up apparatus 1 for a fuel evaporator 2, the warm-up apparatus 1 mainly including an exhaust gas passage 1a, a combustion gas transferring device 10 positioned on one side of the exhaust gas passage 1a, a second injection device 30 positioned on one side of the exhaust gas passage 1a and injecting fuel, such as methanol, and a catalyst combustor 20, and the warm-up apparatus catalytically burning exhaust gas from a fuel cell 6 or fuel supplied from the second injection device 30 at the catalyst combustor 20 and, for example at a start, producing combustion gas to be used as an evaporation heat source for the fuel evaporator 2;

the fuel evaporator 2 for transferring the combustion gas generated at the warm-up apparatus 1 through U-shaped heating medium tubes 2p as an evaporation heat source (FIG. 2) and injecting raw fuel liquid, such a mixture of water and methanol, from a first injection device 2a onto outer surfaces of the heating medium tubes 2p so as to vaporize the raw fuel liquid within an evaporation chamber 2b;

a reformer 3 for reacting raw fuel gas, which is produced by evaporating the raw fuel liquid within the fuel evaporator 2, over a solid catalyst to produce a fuel gas containing hydrogen;

a CO remover 4 for removing carbon monoxide from the fuel gas produced at the reformer 3;

the fuel cell 6 for reacting hydrogen in the fuel gas that is supplied from the CO remover 4 with oxygen contained in the air that is compressed by an air compressor 5 as an oxidant supplying means so as to generate electricity; and a gas/liquid separator 7 for separating and removing moisture from the exhaust gas supplied from the fuel cell 6.

Operation of the above fuel cell system FCS will be described.

A certain amount of raw fuel liquid, such as a mixture of methanol and water, is pumped from a storage tank T to the fuel evaporator 2. A first injection device 2a injects the raw fuel liquid supplied to the fuel evaporator 2 onto outer surfaces of a large number of U-shaped heating medium tubes 2p (FIG. 2) fixed to a tube plate 2c within an evaporation chamber 2b so as to vaporize the raw fuel liquid and produce raw fuel gas. In the steady driving mode, the evaporation heat source of the fuel evaporator 2 is secured in such a way that the exhaust gas containing hydrogen and oxygen remaining unreacted at the hydrogen pole and the oxygen pole of the fuel cell 6 is catalytically burned in the catalyst combustor 20 below the evaporation chamber 2b of the fuel evaporator 2 (see FIG. 2) and that necessary heat quantity is obtained from the generated combustion gas.

Meanwhile, when no evaporation heat source exists at a start and the like, the combustion gas transferring device 10 injects fuel, such as methanol, onto the electrically heated combustion catalyst 10c (see FIG. 2) so that the fuel is catalytically burned to produce combustion gas, and the heat quantity required for warming-up the catalyst combustor 20 is obtained from the produced combustion gas. Further, the heat quantity required for warming-up the catalyst combustor 20 is also obtained in such a way that a second injection device 30 injects fuel, such as methanol, into the catalyst combustor 20 to catalytically burn the fuel.

The raw fuel gas vaporized in the fuel evaporator 2 is transferred to the reformer 3 and is reacted over the solid catalyst so as to be reformed into hydrogen-enriched fuel gas. The hydrogen-enriched fuel gas produced at the reformer 3 is then transferred to the CO remover 4 to remove carbon monoxide within the gas, and thereafter supplied to the fuel cell 6, where hydrogen within the fuel gas is reacted with oxygen contained in the air, which is compressed by the air compressor 5 as an oxidant supplying means, so as to generate electricity. The exhaust gas reacted at the fuel cell 6 is transferred to the gas/liquid separator 7 to separate and remove moisture, and is again catalytically burned at the catalyst combustor 20 to be used as an evaporation heat source of the fuel evaporator 2.

Figure 2:
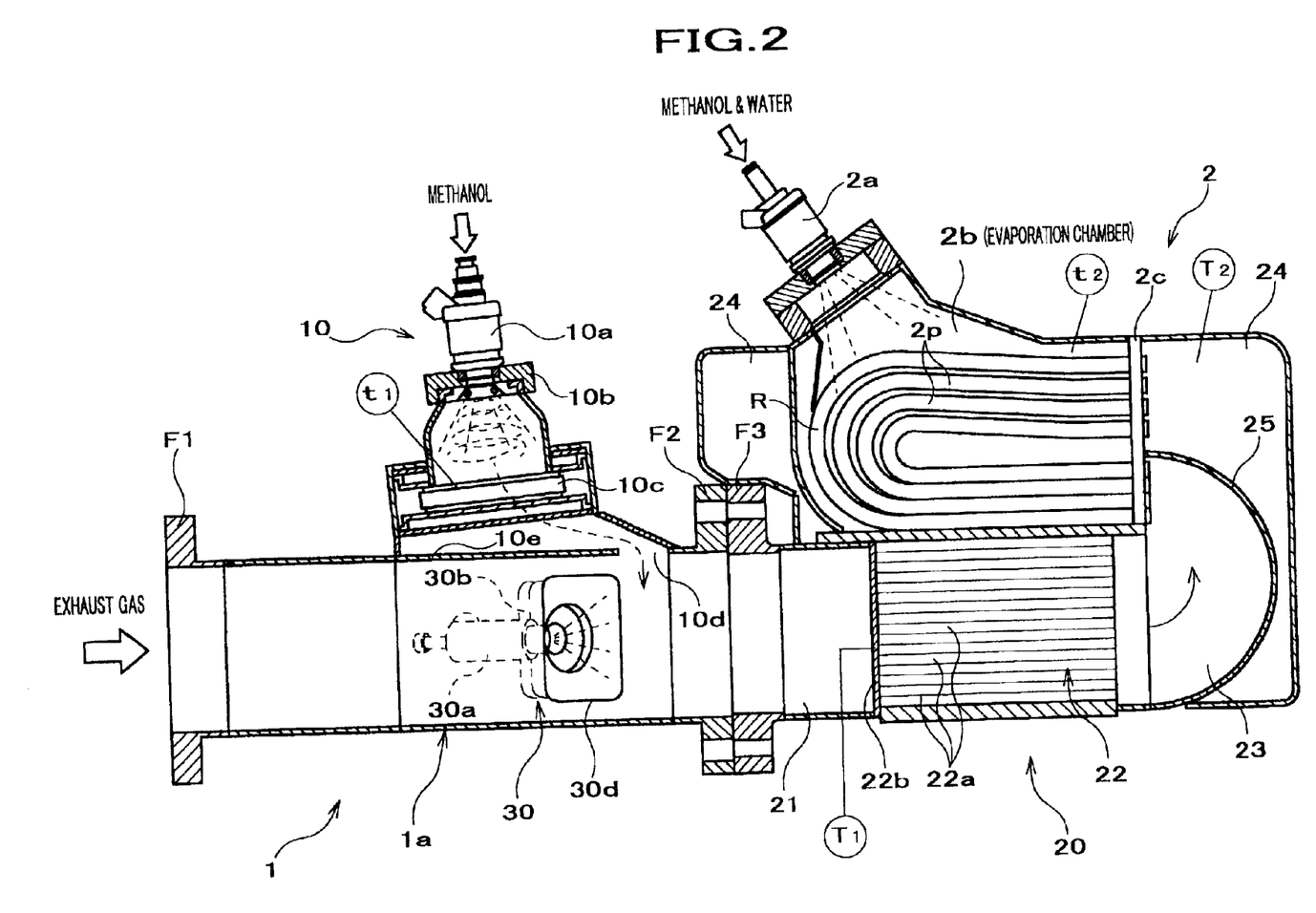
FIG. 2 is a side sectional view showing one embodiment of a warm-up apparatus practicing the warm-up method of a fuel evaporator according to the present invention.

With reference to FIG. 2, one preferred embodiment of the warm-up apparatus practicing the warm-up method of a fuel evaporator according to the present invention will be described.

As shown in FIG. 2, an apparatus, to which is applied the warm-up method of a fuel evaporator according to the present invention, mainly comprises:

the exhaust gas passage 1a for transferring the exhaust gas discharged from the fuel cell 6 into the catalyst combustor 20;

the catalyst combustor 20 provided at a front stage of the fuel evaporator 2 and catalytically burning exhaust gas or fuel from the second injection device 30 with the combustion catalyst 22a to generate combustion gas to be used as an evaporation heat source;

the combustion gas transferring device 10 positioned on one side of the exhaust gas passage 1a and mainly used for warming up the catalyst combustor 20 when actuating the catalyst combustor 20, the combustion gas transferring device 10 mainly comprising an injector 1a as a fuel injection portion, an air injection nozzle 10b or a swirler generating a swirl flow of air, the combustion catalyst 10c for burning a mixture of fuel and air and generating combustion gas, and an outlet 10d for the combustion gas, and the combustion gas, which is produced by injecting fuel from the injector 10a onto the combustion catalyst 10c and thereafter catalytically burning the fuel with the combustion catalyst 10c, being directly transferred from the combustion gas outlet 10d into the catalyst combustor 20;

the second injection device 30 positioned on one side of the exhaust gas passage 1a and mainly used after completing the warm-up of the catalyst combustor 20, the second injection device 30 mainly comprising an injector 30a for injecting fuel, an air injection nozzle 30b or a swirler generating a swirl flow of air, and a fuel outlet 30d, and the second injection device 30 being installed at a position where fuel can be directly injected over the entire surface of the combustion catalyst 22a when the combustion catalyst 22a of the catalyst combustor 20 is thermally activated; and the fuel evaporator 2 transferring the combustion gas generated at the catalyst combustor 20 from the bottom to the top through a plurality of U-shaped heating medium tubes 2p as a heat source, which is fixed to a tube plate 2c, and evaporating the raw fuel liquid, such as a mixture of water and methanol, which is injected from the first injection device 2a onto the outer surfaces of the U-shaped heating medium tubes 2p, within the evaporation chamber 2b.

With reference to FIG. 2, the above constitution of the warm-up apparatus 1 will be described.

The exhaust gas passage 1a is a piping for transferring the exhaust gas discharged from the fuel cell 6 onto the combustion catalyst 22a of the catalyst combustor 20 and having flange portions F1, F2 at both ends. The exhaust gas transferring passage 1a is provided with the combustion gas outlet 10d as an opening for supplying the combustion gas generated at the combustion gas transferring device 10 to the catalyst combustor 20.

A cover plate 10e is provided at the exhaust gas passage 1a for partly blocking a flow of the combustion gas from the combustion gas transferring device 10. The cover plate 10 extends from the wall of the exhaust gas passage 1a along the flow of the exhaust gas. Provided downstream of the cover plate 10e (viz. right end side in FIG. 2) is an opening for the combustion gas outlet 10d of the combustion gas transferring device 10.

The injector 30a of the second injection device 30 injects fuel, and the fuel is further atomized and dispersed by an air injection nozzle 30b or a swirler for generating a swirl flow of air. The atomized and dispersed fuel is then supplied to the catalyst combustor 20 through a fuel outlet 30d.

The catalyst combustor 20 is provided in close contact with and just below the evaporating chamber 2b of the fuel evaporator 2. The catalyst combustor 20 is a combustor for catalytically burning exhaust gas of the fuel cell 6 that is a fuel mixture of hydrogen and air or fuel, such as methanol, and generating combustion gas as an evaporation heat source of the fuel evaporator. A catalyst layer 22 has a rectangular cross section, and a honeycomb-shaped catalyst is filled within the layer. A platinum series catalyst is used as a catalyst. The use of metal honeycomb catalyst improves the heat conduction characteristics. As a carrier, silica and alumina series carriers are used in general. At the front and the rear of the catalyst layer 22, an inlet 21 with a flange portion F3 and an outlet 23 are formed. The inlet 21 is for introducing exhaust gas into the catalyst combustor 20. The outlet 23 is formed by a semicircular separation plate 25, which divides the inside of the combustion gas passage in such a way that when the high temperature combustion gas generated at the combustion layer 22 flows downward, the flow direction of the combustion gas is changed through 180°.

Further, a perforated plate 22b is provided at the inlet of the catalyst layer 22 for uniformly transferring the combustion gas from the combustion gas transferring device 10 into the catalyst layer 22.

The injector 10a as a fuel injection portion of the combustion gas transferring device 10, the air injection nozzle 10b and the combustion catalyst 10c, will be described.

The injector 10a as a fuel injection portion is an injection device in the form of a one-fluid nozzle for injecting and atomizing fuel, such as methanol. The fuel injection quantity can be controlled either by the back pressure of the nozzle (i.e. the fuel injection quantity is in proportion to the square root of the back pressure) or the injection period.

Figure 3A:
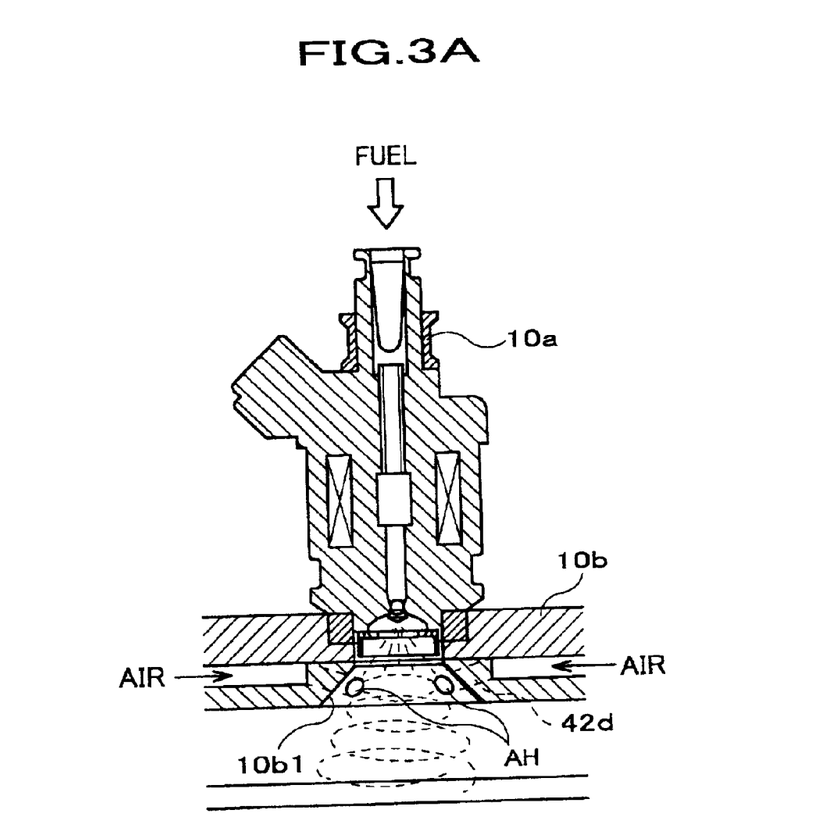
FIG. 3A shows a constitution of an air injection nozzle and an air injection passage according to the present invention.
Figure 3B:
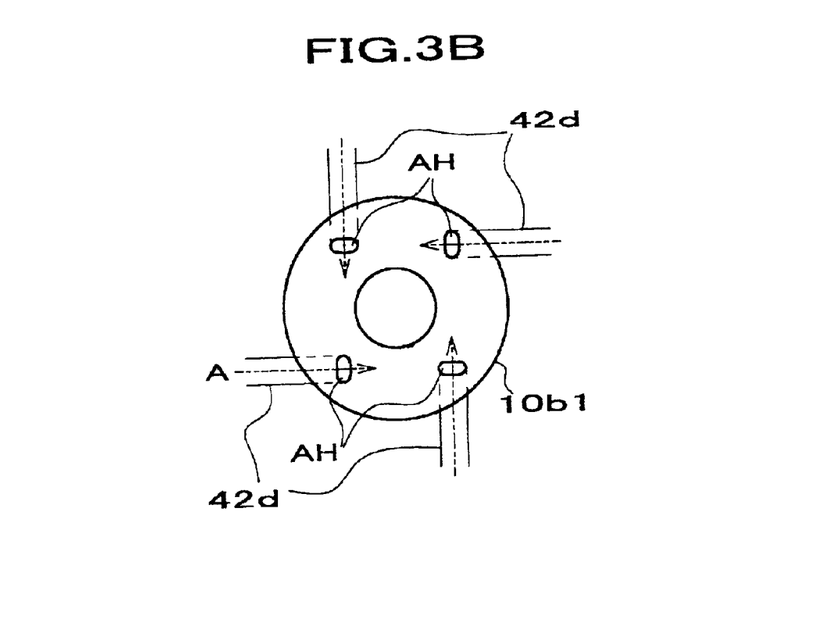
FIG. 3B is a plan view showing an air injection cone of the air injection nozzle.

The air injection nozzle 10b or swirler generates a swirl flow, such as shown in FIG. 3A, so as to make the mixing ratio of fuel in the form of droplets to air for combustion uniform. The air injection nozzle 10b allows gases other than air, and for example, fuel gas may be flown into the nozzle 10b. With reference to FIGS. 3A and 3B, constitution of the air injection nozzle 10b will be described.

The air injection nozzle 10b mainly comprises a frustum conical air injection cone 10b1 and air conducting tubes 42d for guiding air to air injection holes AH formed in the air injection cone 10b1.

Four air injection holes AH are spaced apart in a radial direction of the air injection cone 10b1. All the air injection holes AH have the same open area.

The air injection hole AH is an oblong aperture. When looking from the top, the air injection holes AH are provided symmetrically around the center of the air injection cone 10b1 so that two pairs of holes AH extending diagonally across the center are apart from each other at 90 degrees.

In the above air injection nozzle 10b or swirler, when injecting air through the air conducting tubes 42d and the air injection holes AH into the inside of the air injection cone 10b1, an air current swirling in one direction occurs in the air injection cone 10b1. In the example shown in FIG. 3B, a swirl flow in the counterclockwise direction occurs.

Fuel, such as methanol, injected from the injector 10a is merged with the swirl flow, and the fuel is injected onto the combustion catalyst 10c while swirling together with the air. Because the fuel swirls with air and it takes time before arriving at the combustion catalyst 10c, sufficient time can be obtained for atomizing and dispersing the fuel. As a result, composition of the combustion gas generated at the combustion catalyst 10c becomes uniform. Further, in comparison with a combustion burner without a combustion catalyst, it is possible to burn the fuel with smaller air/fuel ratio, leading to reduced amount of the generated exhaust gas.

Next, the combustion catalyst 10c of the combustion gas transferring device 10 will be described.

The combustion catalyst 10c is electrically heated. The combustion catalyst is based on, as a substrate, an iron-chromium made stainless steel whose electric resistance is enhanced by the expanded metal process. The substrate has a heat resistance glass film or a passivation film formed on the surface thereof, leading to high corrosion resistance. The passivation film is formed by the heat treatment under a particular atmosphere. In the combustion catalyst 10c used herein, a platinum series metal is carried as an active ingredient.

When electrically connected, the combustion catalyst 10c intensively heats fine regions spattered on the upstream end surface of the combustion catalyst 10c. Electrically heated regions are small and quickly rising to the catalytically activating temperature (for example 3 to 5 seconds after conducting electricity) even with low electric power application, and great combustion heat is generated due to oxidation reaction of the fuel (combustion reaction).

Accordingly, it is possible to reduce the time for rising to the activated temperature, at which the combustion catalyst 10c is thermally activated, and the size of the catalyst device becomes smaller. Further, even at the cold start, clean exhaust gas is emitted.

The second injection device 30 mainly comprises the injector 30a for injecting fuel, such as methanol, the air injection nozzle 30b or a swirler for generating a swirl flow of air, and the fuel outlet 30d toward the exhaust gas passage 1a. The second injection device 30 is positioned on one side of the exhaust gas passage 1a and is installed at a position where the fuel, such as methanol, can be directly injected onto the combustion catalyst 22a of the catalyst combustor 20 when the combustion catalyst 22a is thermally activated. Only one second injection device 30 is illustrated in FIG. 2, however, when necessary, a plurality of second injection devices 30 may be used to inject the fuel entirely over the upstream end surface of the combustion layer 22 of the catalyst combustor 20.

The injector 30a and the air injection nozzle 30b are constructed substantially the same as the injector 10a and the air injection nozzle 10b of the combustion gas transferring device 10.

Next, temperature sensors used for the warm-up method of the fuel evaporator will be described.

A temperature sensor T1 as a first temperature measurement device is a sensor for measuring the temperature of the catalyst combustor 20, and it measures the inlet temperature of the catalyst layer 22 of the catalyst combustor 20. The temperature sensor T1 is mounted on the surface of the perforated plate 22b positioned at the inlet of the catalyst layer 22. For example, a thermocouple is used as a temperature sensor.

A temperature sensor T2 as a second temperature measurement device is a sensor for measuring the temperature of the evaporation chamber 2b, and it measures the temperature of the combustion gas after passing through the heating medium tubes 2p. The temperature sensor T2 is mounted on the ceiling of a combustion gas discharging passage 24, which is positioned right after the evaporation chamber 2b. For example, a thermocouple is used as a temperature sensor.

A temperature sensor t1 is for measuring the temperature of the combustion catalyst 10c of the combustion gas transferring device 10. The temperature sensor t1 is mounted on the surface of the combustion catalyst 10c. For example, a thermocouple is used as a temperature sensor.

A temperature sensor t2 is for measuring the temperature of raw fuel gas, which is generated by vaporizing raw fuel liquid, such as a mixture of methanol and water, at the evaporation chamber 2b. The temperature sensor t2 is mounted at the raw fuel gas outlet of the evaporation chamber 2b. For example, a thermocouple is used as a temperature sensor.

Figure 4:
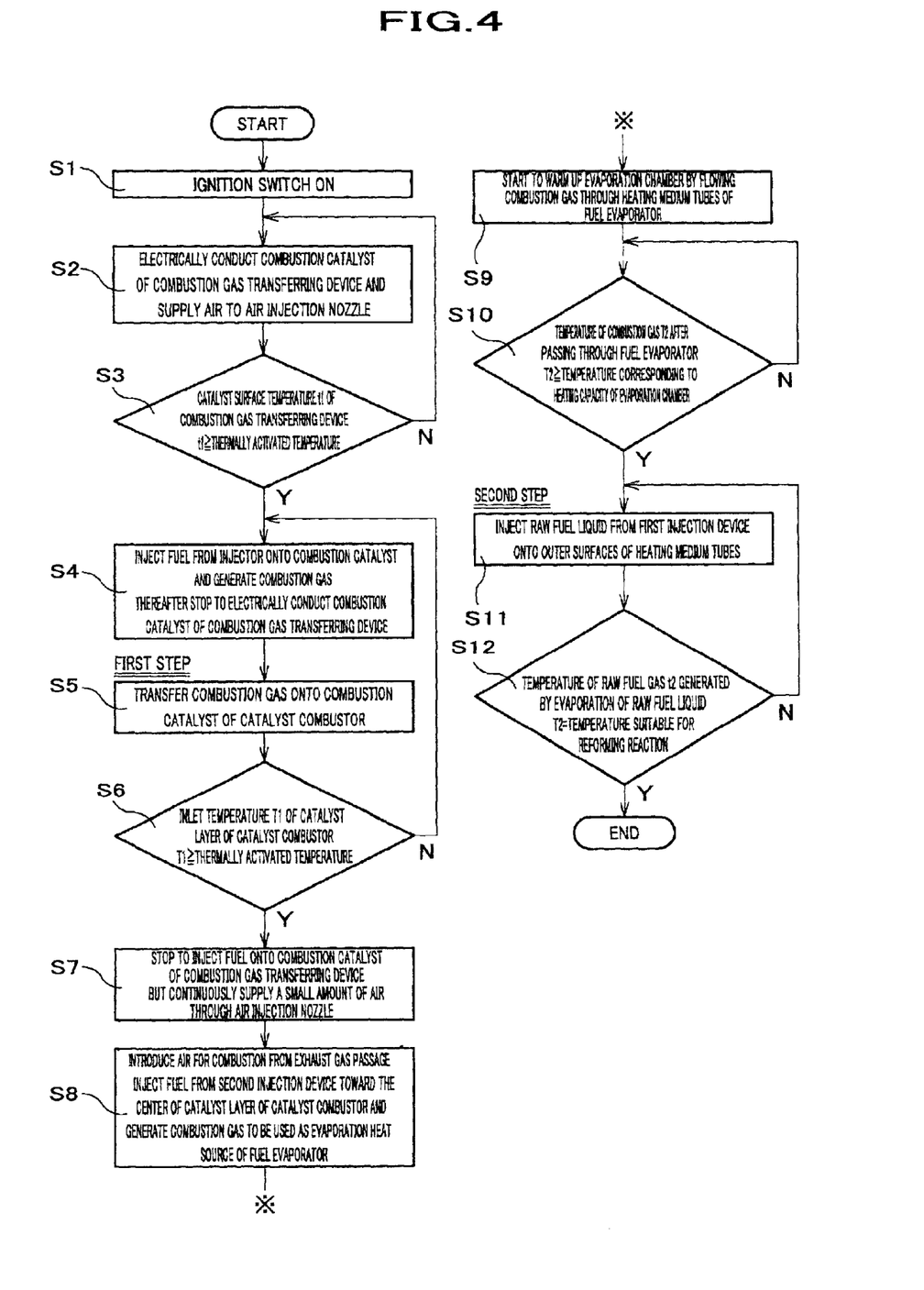
FIG. 4 is a control flow chart showing a first embodiment of the warm-up method according to the present invention.
Figure 5:
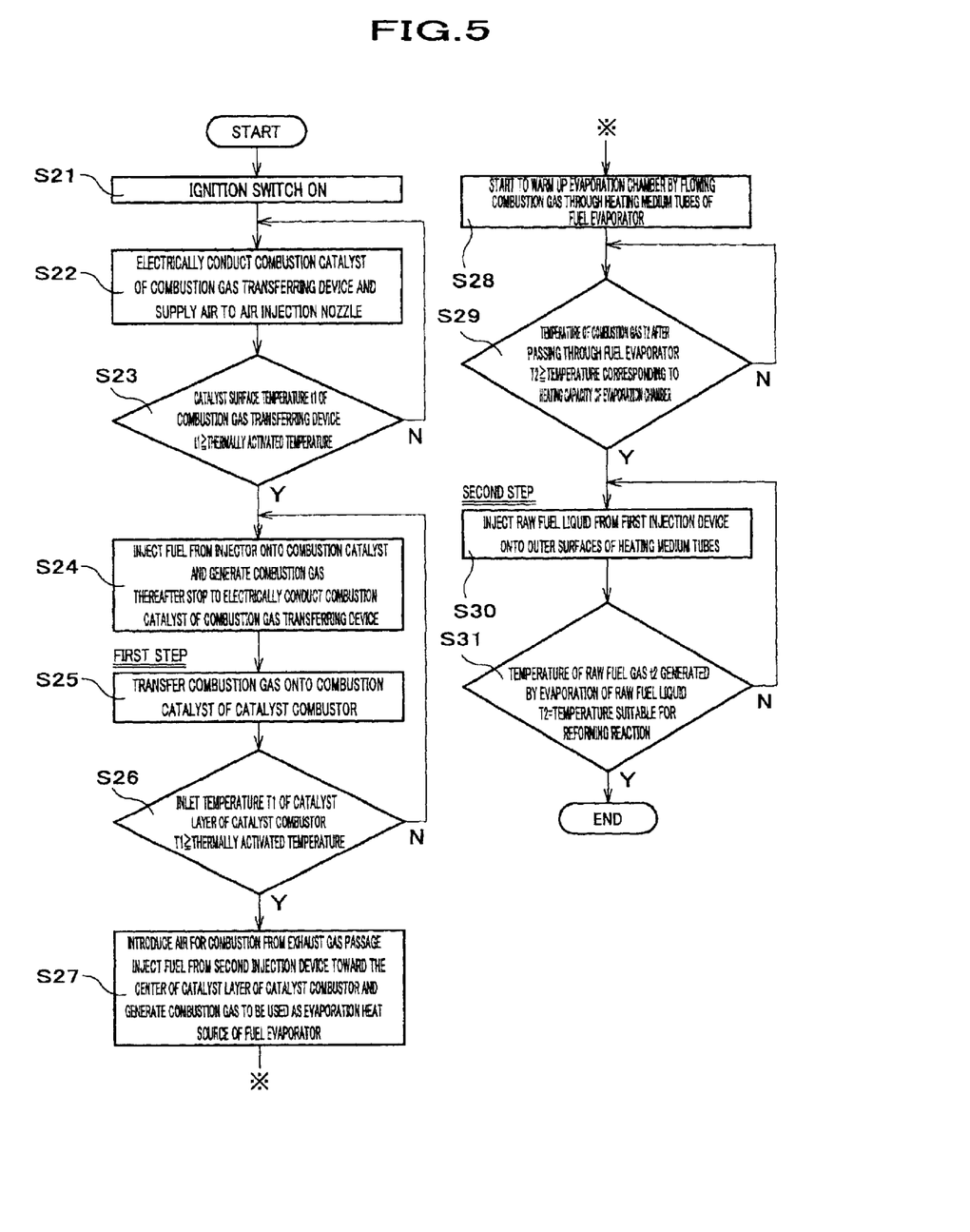
FIG. 5 is a control flow chart showing a second embodiment of the warm-up method according to the present invention.

With reference to FIGS. 4 and 5, a warm-up method of the above fuel evaporator according to the present invention will be described.

Firstly, a control flow chart of a first embodiment will be described with reference to FIG. 4.

Control Flow Chart of First Embodiment (a) Turning on the ignition switch of the vehicle (S1).

(b) Conducting electricity through the combustion catalyst 10c of the combustion gas transferring device 10 and supplying the air injection nozzle 10b with air (S2).

(c) While detecting the catalyst surface temperature of the combustion catalyst 10c of the combustion gas transferring device 10 with the temperature sensor t1 (S3), injecting fuel, such as methanol, from the injector 10a onto the combustion catalyst 10c when the combustion catalyst 10c rises to a certain temperature, for example 120° C., at which the combustion catalyst 10c is thermally activated. The injector 10a starts to inject fuel while air is continuously supplied to the air injection nozzle 10b. Fuel is vaporized and burned to generate combustion gas. Thereafter, stopping electrically conducting the combustion catalyst 10c of the combustion gas transferring device.

(d) Transferring the combustion gas from the combustion gas outlet 10d onto the combustion catalyst 22a of the catalyst combustor 20 through the exhaust gas passage 1a.

(e) While detecting the inlet temperature of the catalyst layer 22 of the catalyst combustor 20 with the temperature sensor T1 as a first temperature measurement device (S6), warming up the catalyst combustor 20 by the combustion gas. And stopping to inject the fuel onto the combustion catalyst 10c of the combustion gas transferring device 10 when the inlet temperature of the catalyst layer 22 rises to a certain temperature, for example 120° C., at which the combustion catalyst 22a is thermally activated. Therefore, the combustion gas transferring device 10 is stopped as a whole. After the stop of the combustion gas transferring device 10, a small amount of air is continuously flown through the air injection nozzle 10b to purge the fuel from the piping, thereby preventing caulking or re-combustion (S7).

(f) Introducing air for combustion from the exhaust gas passage 1a. The air for combustion may be introduced simultaneously with turning on the ignition switch of the vehicle. The fuel, such as methanol, which is injected from the injector 30a of the second injection device 30 and is, likewise the combustion gas transferring device 10, atomized and dispersed with the air injection nozzle 30b, is injected toward the center of the catalyst layer 22 of the catalyst combustor 20 uniformly and entirely over the surface of the catalyst layer 22.

(g) When do so, a small amount of the fuel, such as methanol, and air may be flown from the combustion gas transferring device 10 in accordance with the inlet temperature of the catalyst layer 22. The inlet temperature of the catalyst layer 22 is detected with the temperature sensor T1 as a first temperature measurement device. Therefore, vaporizing the fuel, such as methanol, injected from the second injection device 30 can be promoted.

(h) The fuel, such as methanol, injected from the second injection device is catalytically burned at the combustion catalyst 22a of the catalyst combustor 20, thereby generating combustion gas to be used as a evaporation heat source of the fuel evaporator 2 (S8). Warming up of the evaporation chamber 2b is initiated (S9) when the combustion gas is supplied to the heating medium tubes 2P as a heat source of the fuel evaporator 2.

(i) Detecting the temperature of the combustion gas, which has passed through the fuel evaporator 2, with the temperature sensor T2 as a second temperature measurement device (S10), and then injecting raw fuel liquid, such as a mixture of methanol and water, from the first injection device 2a over the outer surfaces of the heating medium tubes 2p provided within the evaporation chamber 2b (S11) when rising above a certain temperature, for example 200° C., that is corresponding to a heating capacity of the evaporation chamber 2b.

(j) When do so, air may be supplied to the evaporation chamber 2b so as to warm up the reformer 3 and the like provided at a rear stage of the fuel evaporator 2.

(k) Detecting the temperature of the raw fuel gas, which is produced by vaporizing the raw fuel liquid, such as a mixture of methanol and water, at the evaporation chamber 2b, with the temperature sensor t2 (S12), and completing the warming up of the fuel evaporator 2 when rising to a certain temperature, such as 180° C., that is suitable for a reforming reaction of the subsequent reformer 3.

The above steps (a) to (k) are sequence-controlled. As a control method, electronic control may be employed.

Because of the warm-up method consisting of the following three steps, the warm-up of the catalyst combustor 20 can be finished at an optimum timing and it is possible to generate combustion gas used as an evaporation heat source.

These steps are:

(1) At the combustion gas transferring device 10, while detecting the temperature of the temperature sensor t1, the fuel, such as methanol, is vaporized and burned on the combustion catalyst 10c to generate combustion gas. And the catalyst combustor 20 is warmed up through the combustion gas;

(2) At the catalyst combustor 20, while detecting the temperature of the temperature sensor T1 as a first temperature measurement device, the second injection device 30 directly injects the fuel, such as methanol, onto the thermally activated combustion catalyst 22a so as to burn the fuel. The evaporation chamber 2b of the fuel evaporator 2 is warmed up through the resulting combustion gas; and (3) At the fuel evaporator 2, while detecting the temperature of the temperature sensor T2 as a second temperature measurement device, the first injection device 2a injects the raw fuel liquid, such as a mixture of methanol and water, within the evaporation chamber 2b so as to vaporize the raw fuel liquid. When the temperature of the resulting raw fuel gas rises to a temperature suitable for the subsequent reforming reaction, the warming up is finished.

Further, because the raw fuel liquid is injected at an optimum timing, it is possible to ensure a smooth operation from the star to the end of the warm-up.

Control Flow Chart of Second Embodiment

Secondly, a control flow chart of a second embodiment will be described with reference to FIG. 5.

The control flow chart of the second embodiment is substantially the same as that of the first embodiment, except that the step S7 is not included.

Steps S21 to S26 are corresponding to steps S1 to S6 of FIG. 4, respectively. And steps S27 to S31 are corresponding to steps S8 to S12, respectively. Namely, injecting the fuel onto the combustion catalyst 10c of the combustion gas transferring device 10 is not stopped at the aforementioned step (e), and the steps followed after (f) are carried out in the order.

Accordingly, even after completing the warming up of the catalyst combustor 20, the combustion gas transferring device 10 supplies heat to the catalyst combustor 20. As a result, vaporization of the fuel injected from the second injection device 30 is promoted and liquid pool can be prevented, which leads to more effective warm-up operation of the fuel evaporator 20, compared to the warm-up method of the first embodiment.

While the invention has been described in detail and with reference to specific embodiments thereof, it will be apparent to one skilled in the art that various changes and modifications can be made therein without departing from the spirit and scope thereof.

For example, the present invention is applicable to a chemical industrial evaporator, boiler and the like, other than the fuel evaporator for a fuel cell system.

What is claimed is:

1. A method of warming up a fuel evaporator, the fuel evaporator comprising:

an evaporation chamber equipped with a first injection device for injecting raw fuel liquid onto a heat source, and vaporizing the raw fuel liquid on the heat source;

a catalyst combustor having a combustion catalyst, and introducing catalytically burned combustion gas into the heat source of said evaporation chamber;

a second injection device for supplying fuel to said catalyst combustor;

a combustion gas transferring device equipped with a fuel injection portion and a combustion catalyst, and the fuel injection portion injecting fuel onto the combustion catalyst to generate a catalytically burned gas, which is then transferred to the catalyst combustor;

a first temperature measurement device for measuring a temperature of said catalyst combustor; and a second temperature measurement device for measuring a temperature of said evaporation chamber, wherein the method comprising the steps of:

transferring the combustion gas with the combustion gas transferring device;

stopping the combustion gas transferring device in accordance with a temperature of said catalyst combustor measured by the first temperature measurement device, and transferring fuel to said catalyst combustor with the second injection device; and injecting the raw fuel liquid from the first injection device in accordance with a temperature of said evaporation chamber measured by the second temperature measurement device so as to vaporize the raw fuel liquid within the evaporation chamber.

2. A method of warming up a fuel evaporator according to claim 1, wherein air is supplied to the fuel injection portion of said combustion gas transferring device, and thereafter, while continuously supplying air, said fuel injection portion starts to inject fuel when the electrically heated combustion catalyst of said combustion gas transferring device is thermally activated.

3. A method of warming up a fuel evaporator according to claim 1, wherein said combustion gas transferring device stops to inject fuel when said catalyst combustor rises to a temperature, at which the combustion catalyst thereof is thermally activated.

4. A method of warming up a fuel evaporator according to claim 2, wherein a small amount of air is continuously supplied to said fuel injection portion after said combustion gas transferring device is stopped.

5. A method of warming up a fuel evaporator according to claim 2, wherein a small amount of fuel and air is flown from the fuel injection portion of said combustion gas transferring device in accordance with a temperature of said catalyst combustor, so as to promote vaporization of the fuel injected from said second injection device.

6. A method of warming up a fuel evaporator according to claim 1, wherein raw fuel liquid is injected from said first injection device onto said heat source when a temperature of the combustion gas, which has passed through the fuel evaporator, rises above a certain temperature corresponding to a heating capacity of said evaporation chamber.

7. A method of warming up a fuel evaporator according to claim 1, wherein warming-up of the fuel evaporator is finished when a temperature of raw fuel gas, which is generated by vaporizing the raw fuel liquid, rises to a certain temperature suitable for a subsequent reforming reaction.

8. A method of warming up a fuel evaporator according to claim 1, wherein said first temperature measurement device and said second temperature measurement device are temperature sensors comprising a thermocouple.

9. A method of warming up a fuel evaporator according to claim 1, wherein said heat source is formed by a plurality of heating medium tubes.

10. A method of warming up a fuel evaporator, the fuel evaporator comprising:

an evaporation chamber equipped with a first injection device for injecting raw fuel liquid onto a heat source, and vaporizing the raw fuel liquid on the heat source;

a catalyst combustor having a combustion catalyst, and introducing catalytically burned combustion gas into the heat source of said evaporation chamber;

a second injection device for supplying fuel to said catalyst combustor;

a combustion gas transferring device equipped with a fuel injection portion and a combustion catalyst, and the fuel injection portion injecting fuel onto the combustion catalyst to generate a catalytically burned gas, which is then transferred to the catalyst combustor;

a first temperature measurement device for measuring a temperature of said catalyst combustor; and a second temperature measurement device for measuring a temperature of said evaporation chamber, wherein the method comprising the steps of:

transferring the combustion gas with the combustion gas transferring device;

transferring fuel to said catalyst combustor with the second injection device, while transferring the combustion gas with the combustion gas transferring device in accordance with a temperature of said catalyst combustor measured by the first temperature measurement device, and injecting the raw fuel liquid from the first injection device in accordance with a temperature of said evaporation chamber measured by the second temperature measurement device so as to vaporize the raw fuel liquid within the evaporation chamber.

11. A method of warming up a fuel evaporator according to claim 10, wherein air is supplied to the fuel injection portion of said combustion gas transferring device, and thereafter, while continuously supplying air, said fuel injection portion starts to inject fuel when the electrically heated combustion catalyst of said combustion gas transferring device is thermally activated.

12. A method of warming up a fuel evaporator according to claim 10, wherein raw fuel liquid is injected from said first injection device onto said heat source when a temperature of the combustion gas, which has passed through the fuel evaporator, rises above a certain temperature corresponding to a heating capacity of said evaporation chamber.

13. A method of warming up a fuel evaporator according to claim 10, wherein warming-up of the fuel evaporator is finished when a temperature of raw fuel gas, which is generated by vaporizing the raw fuel liquid, rises to a certain temperature suitable for a subsequent reforming reaction.

14. A method of warming up a fuel evaporator according to claim 10, wherein said first temperature measurement device and said second temperature measurement device are temperature sensors comprising a thermocouple.

15. A method of warming up a fuel evaporator according to claim 10, wherein said heat source is formed by a plurality of heating medium tubes.

* * * * *